(12) United States Patent
Min

(10) Patent No.: US 9,255,615 B2
(45) Date of Patent: Feb. 9, 2016

(54) CLUTCH PEDAL APPARATUS FOR VEHICLE FOR REDUCING EFFORT

(71) Applicants: Hyundai Motor Company, Seoul (KR); Kia Motors Corp., Seoul (KR)

(72) Inventor: Jeong Seon Min, Gwangju (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/272,354

(22) Filed: May 7, 2014

(65) Prior Publication Data

US 2015/0152925 A1    Jun. 4, 2015

(30) Foreign Application Priority Data

Dec. 3, 2013  (KR) .................. 10-2013-0149375

(51) Int. Cl.
  *F16D 27/14*   (2006.01)
  *G05G 1/44*    (2008.04)
  *G05G 1/46*    (2008.04)

(52) U.S. Cl.
  CPC  *F16D 27/14* (2013.01); *G05G 1/44* (2013.01); *G05G 1/46* (2013.01); *Y10T 74/20528* (2015.01)

(58) Field of Classification Search
  None
  See application file for complete search history.

(56) References Cited

U.S. PATENT DOCUMENTS 4,470,030 A * 9/1984 Myers ................... 335/228

FOREIGN PATENT DOCUMENTS

| JP | 2006-160134 A | 6/2006 | |
|----|---------------|--------|---|
| KR | 1998-021750 A | 6/1998 | |
| KR | 1999-015171 A | 3/1999 | |
| KR | 0135490 Y1 | 3/1999 | |
| KR | 10-2006-0016380 | 2/2006 | |
| KR | 10-2007-0021717 A | 2/2007 | |
| KR | 10-2011-0077364 A | 7/2011 | |
| KR | 10-2011-0131524 A | 12/2011 | |
| KR | 2011131524 A * | 12/2011 | ............. B60K 23/02 |

* cited by examiner

*Primary Examiner* — Thomas Diaz
(74) *Attorney, Agent, or Firm* — Morgan, Lewis & Bockius LLP

(57) ABSTRACT

A clutch pedal apparatus for a vehicle for reducing effort may include a rear fixed magnet and a front fixed magnet respectively fixed at an initial position and a last position of a movement section of a pushrod with a predetermined distance in a cylinder housing included in a clutch master cylinder, and a moveable magnet coupled to the pushrod disposed between the rear fixed magnet and the front fixed magnet, wherein the moveable magnet guides complete restoration of a pedal arm via magnetic force with the rear fixed magnet during an initial manipulation and reverse restoration of the pedal arm and generates a turnover force via a magnetic force with the front fixed magnet during a full stroke manipulation of the pedal arm.

8 Claims, 5 Drawing Sheets

CLUTCH PEDAL APPARATUS FOR VEHICLE FOR REDUCING EFFORT

CROSS REFERENCE TO RELATED APPLICATION

The present application claims priority to Korean Patent Application No. 10-2013-0149375, filed on Dec. 3, 2013, the entire contents of which is incorporated herein for all purposes by this reference.

BACKGROUND OF THE INVENTION

1. Field of the Invention

The present invention relates to a clutch pedal apparatus for a vehicle for reducing effort, and more particularly, to a clutch pedal apparatus for a vehicle for reducing effort, for guiding complete restoration of a pedal arm during initial manipulation or reverse restoration of the pedal arm and generating a turnover force during full stroke manipulation of the pedal arm to reduce effort that a driver exerts.

2. Description of Related Art

With regard to a manual transmission vehicle, it is necessary to completely restore a pedal arm to smoothly transmit power of an engine to transmission during initial manipulation or reverse restoration of a pedal arm.

When the pedal arm is not completely restored, sliding occurs between a clutch disk and a flywheel, thereby causing early abrasion of the clutch disk.

In addition, effort that a driver exerts is reduced during manipulation of the pedal arm only when a turnover force for pulling the pedal arm forward is generated during full stroke manipulation of the pedal arm, thereby reducing fatigue of the driver due to manipulation of the pedal arm.

As illustrated in FIGS. 1A and 1B, a conventional clutch pedal apparatus includes a return spring 5, opposite ends of which are supported by a cylinder housing 4 and an end of a pushrod 3 for connecting a pedal arm 1 and a clutch master cylinder 2. The return spring 5 is a compression spring for exerting an elastic force for pushing the pushrod 3 in a reverse direction toward the driver.

However, in the aforementioned conventional structure using the return spring 5, a direction for manipulation of the pedal arm 1 is opposite to a direction of a spring force of the return spring 5. Thus, the driver manipulates the pedal arm 1 with a force against the spring force of the return spring 5, thereby increasing fatigue of the driver due to manipulation of the pedal arm.

In addition, the spring force of the return spring 5 is gradually reduced as usage time is increased, and thus, complete restoration of the pedal arm 1 is not allowed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a clutch pedal apparatus for a vehicle for reducing effort, for guiding complete restoration of a pedal arm during initial manipulation or reverse restoration of the pedal arm to achieve complete connection between a clutch disk and a flywheel and generating a turnover force during full stroke manipulation of the pedal arm to reduce effort that a driver exerts, thereby reducing fatigue of the driver due to manipulation of the pedal arm.

In an aspect of the present invention, a clutch pedal apparatus for a vehicle for reducing effort may include a rear fixed magnet and a front fixed magnet respectively fixed at an initial position and a last position of a movement section of a pushrod with a predetermined distance in a cylinder housing included in a clutch master cylinder, and a moveable magnet coupled to the pushrod disposed between the rear fixed magnet and the front fixed magnet, wherein the moveable magnet guides complete restoration of a pedal arm via magnetic force with the rear fixed magnet during an initial manipulation and reverse restoration of the pedal arm and generates a turnover force via a magnetic force with the front fixed magnet during a full stroke manipulation of the pedal arm.

The rear fixed magnet and the moveable magnet are formed with different polarities to generate attractive force with respect to each other.

The front fixed magnet and the moveable magnet are formed with different polarities to generate attractive force with respect to each other.

The moveable magnet is configured to vary a coupling position in a longitudinal direction of the pushrod in order to adjust turnover force generation time during manipulation of the pedal arm.

A saw-toothed rod ratchet is formed on an outer circumference surface of the pushrod between the rear fixed magnet and the front fixed magnet in a longitudinal direction, and a magnet ratchet coupled to the rod ratchet is formed on an inner circumference surface of the moveable magnet.

The moveable magnet is divided into an upper magnet and a lower magnet, formed in a semicircular shape, in order to easily vary the coupling position of the moveable magnet.

A saw-toothed rod ratchet is formed on an outer circumference surface of the pushrod between the rear fixed magnet and the front fixed magnet in a longitudinal direction, and a magnet ratchet coupled to the rod ratchet is formed on an inner circumference surface of the upper and lower magnets.

The front fixed magnet is divided into an upper front fixed magnet and a lower front fixed magnet and the rear fixed magnet is divided into an upper rear fixed magnet and a lower rear fixed magnet.

The upper magnet and the lower magnet are formed with different polarities to form a circular form by coupling between the upper magnet and the lower magnet according to magnetic force.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
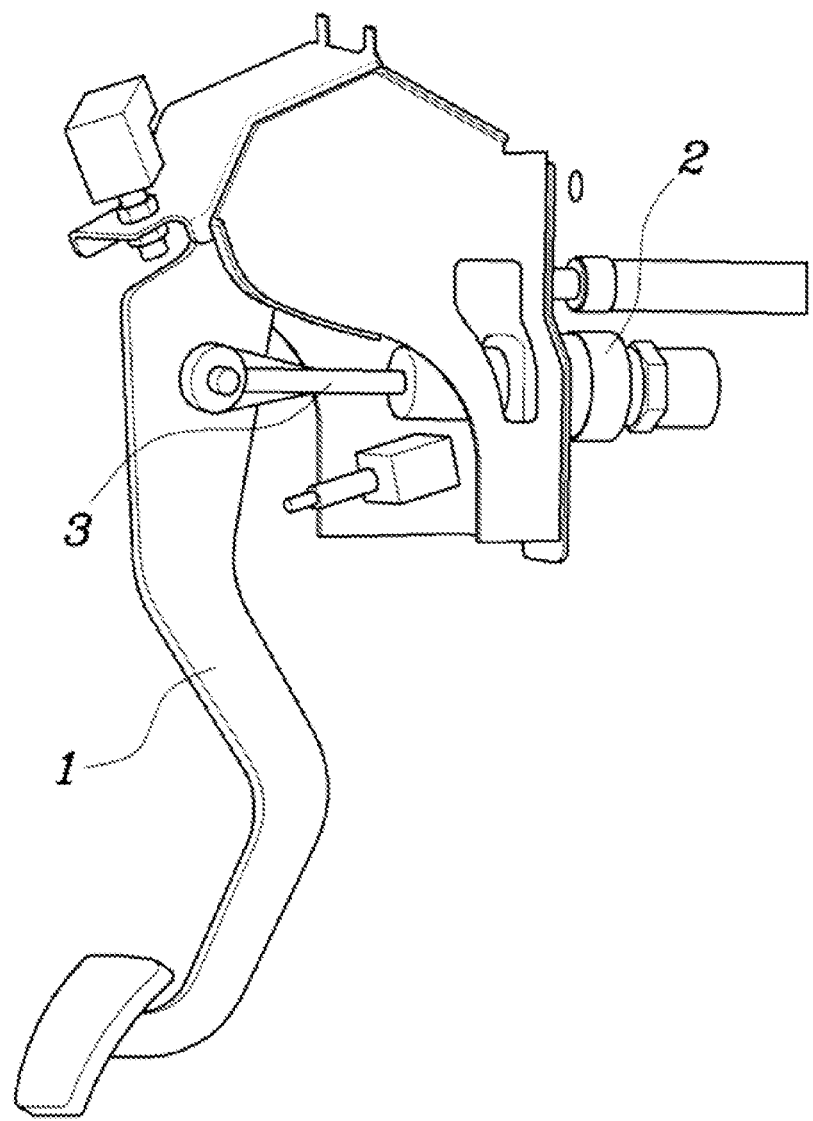
FIG. 1A is a diagram for explanation of a conventional clutch pedal apparatus.
Figure 1B:
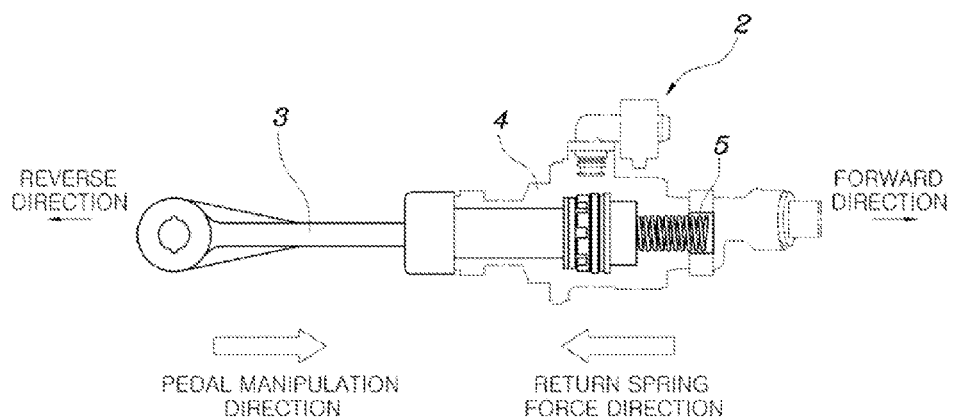
FIG. 1B is an enlarged view of a clutch master cylinder 2 in the conventional clutch pedal apparatus.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a clutch pedal apparatus for a vehicle for reducing effort according to an exemplary embodiment of the present invention will be described with reference to the accompanying drawings.

As illustrated in FIGS. 2A to 5B, the clutch pedal apparatus for a vehicle for reducing effort according to an exemplary embodiment of the present invention includes a pedal arm 10 coupled to a pedal member rotatably in forward or reverse directions, a pushrod 30 for connecting the pedal arm 10 and a clutch master cylinder 20, a rear fixed magnet 40 and a front fixed magnet 50 that are respectively fixed at an initial position and a last position of a movement section L1 of the pushrod 30 in a cylinder housing 21 included in the clutch master cylinder 20, and a moveable magnet 60 coupled to the pushrod 30 disposed between the rear fixed magnet 40 and the front fixed magnet 50, for guiding complete restoration of the pedal arm 10 via magnetic force with the rear fixed magnet 40 during initial manipulation and reverse restoration of the pedal arm 10 and for generating a turnover force via magnetic force with the front fixed magnet 50 during full stroke manipulation of the pedal arm 10.

Here, the pedal member is fixed to a vehicle panel (dash panel) of a front side of a lower portion of a driver's seat. The pedal arm 10 is rotatably coupled to the pedal member using a pedal hinge as a medium while an upper lateral portion thereof is inserted into the pedal member.

According to an exemplary embodiment of the present invention, for complete restoration of the pedal arm 10 and generation of a turnover force, the rear fixed magnet 40 and the moveable magnet 60 are configured to generate attractive force with respect to each other, and the front fixed magnet 50 and the moveable magnet 60 are also configured to generate attractive force with respect to each other.

According to an exemplary embodiment of the present invention, in order to adjust a point of time for generating a turnover force during manipulation of the pedal arm 10, the moveable magnet 60 is configured to vary a coupling position in a longitudinal direction of the pushrod 30. To this end, a saw-toothed rod ratchet 31 is formed on an outer circumference surface of the pushrod 30 between the rear fixed magnet 40 and the front fixed magnet 50 in a longitudinal direction, and a magnet ratchet 61 coupled to the rod ratchet 31 is formed on an inner circumference surface of the moveable magnet 60.

In addition, according to an exemplary embodiment of the present invention, in order to easily vary a coupling position of the moveable magnet 60, the moveable magnet 60 is divided into an upper magnet 62 and a lower magnet 63 that are formed in a semicircular shape, and the upper magnet 62 and the lower magnet 63 are formed to have opposite polarities (N and S poles) generating attractive force with respect to each other to form a circular form by coupling between the upper magnet 62 and the lower magnet 63 according to magnetic force.

Hereinafter, an operation according to an exemplary embodiment of the present invention will be described.

Figure 2A:
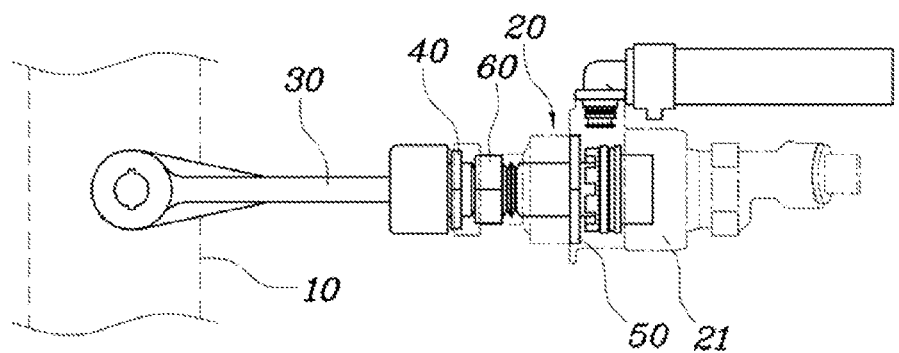
FIG. 2A is a diagram for explanation of a clutch pedal apparatus for a vehicle for reducing effort according to an exemplary embodiment of the present invention.
Figure 2B:
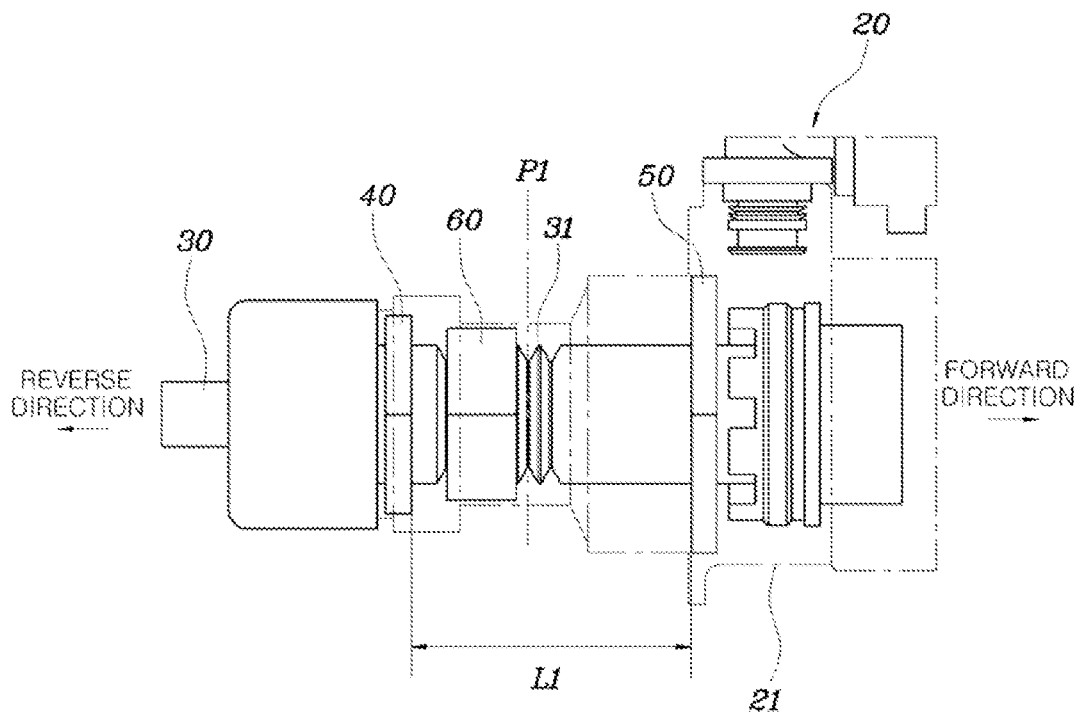
FIG. 2B is an enlarged view of a clutch master cylinder 20 according to the exemplary embodiment of the present invention.
Figure 3:
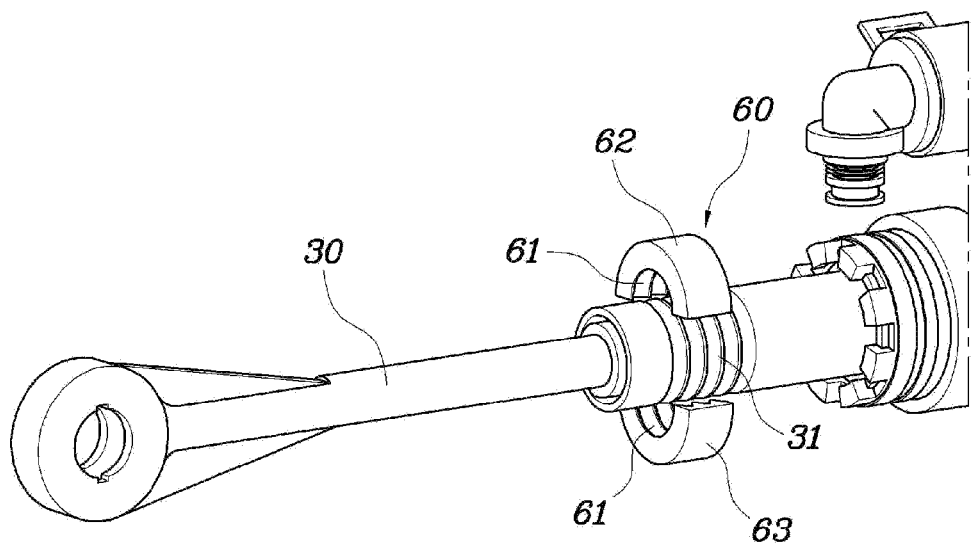
FIG. 3 is a diagram for explanation of a moveable magnet according to an exemplary embodiment of the present invention.

A state illustrated in FIGS. 2A and 2B is a state in which the pedal arm 10 is maximally rotated towards a driver, that is, a state before the driver steps on the pedal arm 10 or an initial state before a force is applied to the pedal arm 10. In this case, according to magnetic forces of the rear fixed magnet 40 and the moveable magnet 60 which have different polarities (N and S poles), the pushrod 30 is maintained in a state of being moved in a reverse direction toward the driver.

In the aforementioned initial state, according to generation of an attractive force between the rear fixed magnet 40 and the moveable magnet 60, the pedal arm 10 is maintained in a robust complete restoration state to achieve complete connection between the clutch disk and the flywheel, and thus, it is advantageous that components may be sufficiently used without damage thereof also in a high-powered car with high engine output.

In the aforementioned state, when the driver manipulates a vehicle by stepping on the pedal arm 10, the pushrod 30 is moved in a forward direction according to forward rotation of the pedal arm 10. In this process, in an initial manipulation state before current time reaches time (P1, time when the amount of an attractive force between the rear fixed magnet 40 and the moveable magnet 60 is the same as the amount of an attractive force between the front fixed magnet 50 and the moveable magnet 60) when the moveable magnet 60 generates a turnover force, the amount of attractive force between the rear fixed magnet 40 and the moveable magnet 60 is greater than the amount of attractive force between the front fixed magnet 50 and the moveable magnet 60, and thus, a force is applied to the pedal arm 10 to rotate in the reverse direction toward the driver, thereby guiding complete restoration of the pedal arm 10.

In addition, when a current state is changed to an initial manipulation state from the aforementioned initial state, effort that a driver exerts through the pedal arm 10 is gradually reduced. Through this, the driver may recognize a reaction transmitted from the pedal arm 10 to recognize an operation state of the pedal arm 10.

Figure 4:
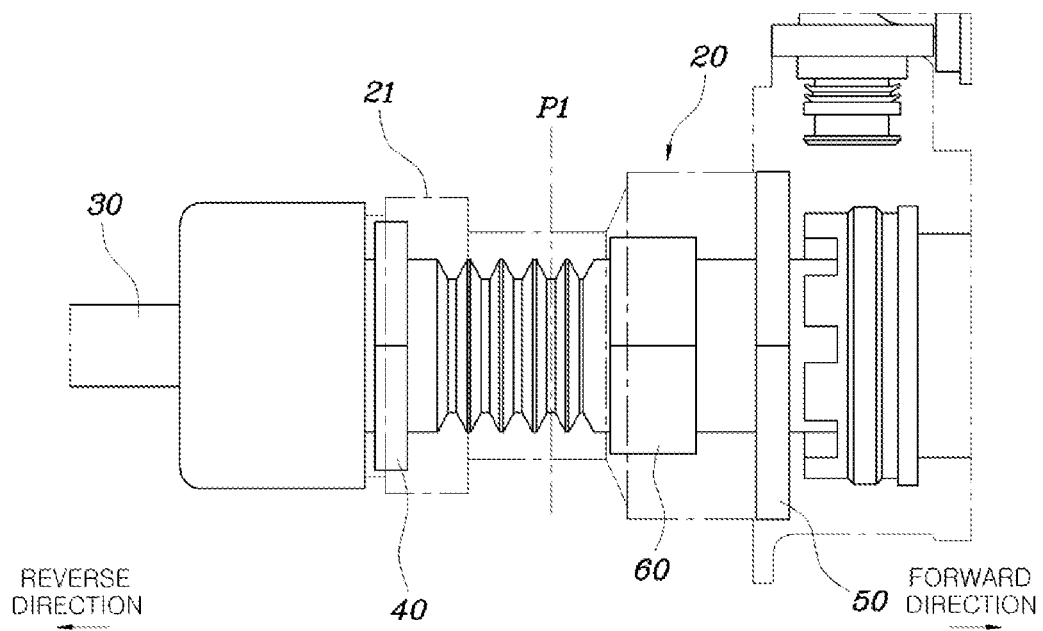
FIG. 4 is a diagram illustrating a full stroke state of a pedal arm.

FIG. 4 illustrates a state in which the moveable magnet 60 passes the turnover force generation time P1 according to continuous forward rotation of the pedal arm 10, that is, a full stroke manipulation state of the pedal arm 10. In this case, a clutch is in a connection release state.

During change to the full stroke state illustrated in FIG. 4 from the initial state illustrated in FIGS. 2A and 2B, from a point of time when the moveable magnet 60 passes the turnover force generation time P1, the amount of attractive force between the rear fixed magnet 40 and the moveable magnet 60 is smaller than the amount of attractive force between the front fixed magnet 50 and the moveable magnet 60, and thus, the pushrod 30 is abruptly moved in a forward direction according to magnetic force between the front fixed magnet 50 and the moveable magnet 60 to generate a high force for reducing effort, thereby largely reducing effort that the driver exerts. Accordingly, fatigue of the driver may be reduced according to the reduced effort during manipulation of the pedal arm 10.

According to an exemplary embodiment of the present invention, also in a process in which the pedal arm 10 that rotates in the forward direction is restored in the reverse direction, when the moveable magnet 60 passes the turnover force generation time P1 and is moved toward the rear fixed magnet 40, the pushrod 30 is pulled in the reverse direction toward the driver according to the attractive force between the rear fixed magnet 40 and the moveable magnet 60, thereby guiding complete restoration of the pedal arm 10. Accordingly, it is advantageous to achieve more complete connection between the clutch disk and the flywheel.

Figure 5A:
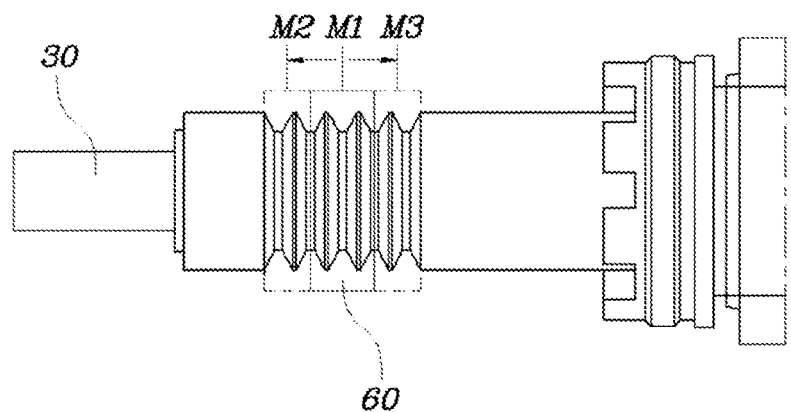
FIG. 5A is a diagram for illustrating a coupling position of a moveable magnet according to an exemplary embodiment of the present invention.
Figure 5B:
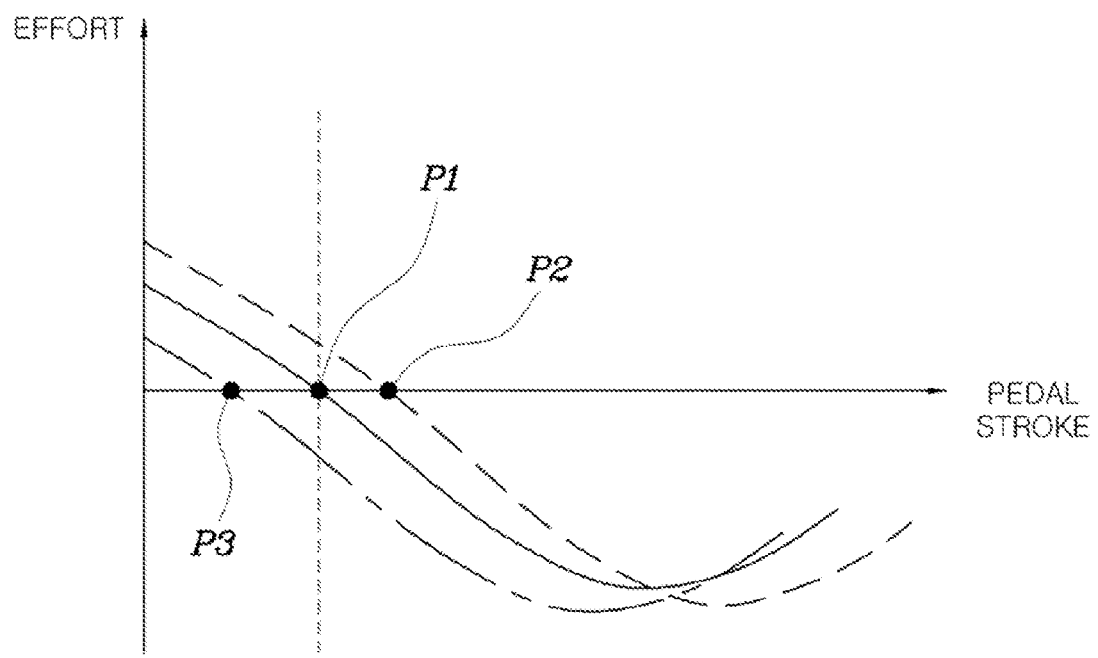
FIG. 5B is a diagram for explanation of a state of adjusting turnover force generation time by varying a coupling position of a moveable magnet according to an exemplary embodiment of the present invention.

An exemplary embodiment of the present invention is configured to freely adjust the turnover force generation time P1 by changing a coupling position of the moveable magnet 60 according to a vehicle type or user demand. That is, as illustrated in FIGS. 5A and 5B, the coupling position of the moveable magnet 60 may be freely changed to a front position M2 and a rear position M3 based on an initial position M1.

Since the moveable magnet 60 is divided into the upper magnet 62 and the lower magnet 63, the upper magnet 62 and the lower magnet 63 may be separated from each other, the upper magnet 62 and the lower magnet 63 may be moved to a wanted position, and the upper magnet 62 and the lower magnet 63 may be coupled to each other via magnetic force, thereby achieving robust coupling between the upper magnet 62 and the lower magnet 63 according to coupling between the rod ratchet 31 of the pushrod 30 and the magnet ratchet 61 of the moveable magnet 60.

When the moveable magnet 60 is coupled to an initial position, the turnover force generation time is P1. When the moveable magnet 60 is moved to the front position M2, the turnover force generation time is P2. Accordingly, the turnover force generation time may be delayed compared with the initial position. On another hand, when the moveable magnet 60 is moved to the rear position M3, the turnover force generation time is P3. Accordingly, the turnover force generation time may be adjusted earlier than initial position.

In another exemplary embodiment of the present invention, the front fixed magnet 50 and the rear fixed magnet 40 may be divided into, the upper front fixed magnet and the lower front fixed magnet and the upper rear fixed magnet and the lower rear fixed magnet.

As described above, according to the exemplary embodiments of the present invention, during the initial state, the initial manipulation state, and the reverse restoration of the pedal arm 10, the pushrod 30 is pulled in the reverse direction toward the driver according to the attractive force between the rear fixed magnet 40 and the moveable magnet 60, thereby guiding complete restoration of the pedal arm 10. Accordingly, it is advantageous to achieve more complete connection between the clutch disk and the flywheel and to sufficiently use components without damage thereof also in a high-powered car with high engine output.

In addition, according to an exemplary embodiment of the present invention, from a point of time when the moveable magnet 60 passes the turnover force generation time P1 according to full stroke manipulation of the pedal arm 10, the pushrod 30 may be pulled to the forward direction according to the attractive force between the front fixed magnet 50 and the moveable magnet 60 to generate a high force for reducing effort, thereby largely reducing effort transmitted to the pedal arm 10. Accordingly, fatigue of the driver due to manipulation of the pedal arm 10 may be reduced.

According to an exemplary embodiment of the present invention, during rotation of a pedal arm according to manipulation of a driver, effort of the driver may be largely reduced, thereby largely reducing fatigue of the driver due to manipulation of the pedal arm. In addition, during initial manipulation or reverse restoration of the pedal arm, complete restoration of the pedal arm may be guided to achieve more complete connection between the clutch disk and the flywheel and to sufficiently use components without damage thereof also in a high-powered car with high engine output.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutch pedal apparatus for a vehicle for reducing effort, comprising:
   a rear fixed magnet and a front fixed magnet respectively fixed at an initial position and a last position of a movement section of a pushrod with a predetermined distance in a cylinder housing included in a clutch master cylinder; and
   a moveable magnet coupled to the pushrod disposed between the rear fixed magnet and the front fixed magnet,
   wherein the moveable magnet guides complete restoration of a pedal arm via magnetic force with the rear fixed magnet during an initial manipulation and reverse restoration of the pedal arm and generates a turnover force via a magnetic force with the front fixed magnet during a full stroke manipulation of the pedal arm,
   wherein a saw-toothed rod ratchet is formed on an outer circumference surface of the pushrod between the rear fixed magnet and the front fixed magnet in a longitudinal direction; and
   wherein a magnet ratchet coupled to the rod ratchet is formed on an inner circumference surface of the moveable magnet.

2. The clutch pedal apparatus of claim 1, wherein the rear fixed magnet and the moveable magnet are formed with different polarities to generate attractive force with respect to each other.

3. The clutch pedal apparatus of claim 1, wherein the front fixed magnet and the moveable magnet are formed with different polarities to generate attractive force with respect to each other.

4. The clutch pedal apparatus of claim 1, wherein the moveable magnet is configured to vary a coupling position in a longitudinal direction of the pushrod in order to adjust turnover force generation time during manipulation of the pedal arm.

5. The clutch pedal apparatus of claim 4, wherein the moveable magnet is divided into an upper magnet and a lower magnet, formed in a semicircular shape, in order to easily vary the coupling position of the moveable magnet.

6. The clutch pedal apparatus of claim 5,
wherein a saw-toothed rod ratchet is formed on an outer circumference surface of the pushrod between the rear fixed magnet and the front fixed magnet in a longitudinal direction; and
wherein a magnet ratchet coupled to the rod ratchet is formed on an inner circumference surface of the upper and lower magnets.

7. The clutch pedal apparatus of claim 5, wherein the front fixed magnet is divided into an upper front fixed magnet and a lower front fixed magnet and the rear fixed magnet is divided into an upper rear fixed magnet and a lower rear fixed magnet.

8. The clutch pedal apparatus of claim 5, wherein the upper magnet and the lower magnet are formed with different polarities to form a circular form by coupling between the upper magnet and the lower magnet according to magnetic force.

* * * * *